United States Patent [19]

Bowerman

[11] 4,064,528
[45] Dec. 20, 1977

[54] METHOD AND APPARATUS FOR ENHANCING A TELEVISED OBJECT

[76] Inventor: William R. Bowerman, 1824 Mississippi St., Lawrence, Kans. 66044

[21] Appl. No.: 512,959

[22] Filed: Oct. 7, 1974

Related U.S. Application Data

[63] Continuation-in-part of Ser. No. 256,876, May 25, 1972, Pat. No. 3,840,699.

[51] Int. Cl.$^2$ .................. H04N 9/535; H04N 7/18
[52] U.S. Cl. .................................. 358/22; 358/93; 358/183; 358/125
[58] Field of Search ............... 178/DIG. 21, DIG. 34, 178/DIG. 6, DIG. 20, DIG. 1, 6, 6.8; 340/146.3 AE, 146.3 AH; 358/1, 22, 41, 80, 93, 103, 108, 109, 125, 126, 107, 183, 166, 113

[56] References Cited

U.S. PATENT DOCUMENTS

| 3,039,002 | 6/1962 | Guerth | 178/DIG. 21 |
|---|---|---|---|
| 3,379,830 | 4/1968 | Menke | 358/93 |
| 3,562,423 | 2/1971 | Murphy | 178/DIG. 21 |
| 3,566,026 | 2/1971 | Bonebreak | 178/DIG. 21 |
| 3,571,504 | 5/1971 | Kiuchi et al. | 358/113 |
| 3,646,264 | 2/1972 | Waugh | 358/125 |
| 3,761,612 | 9/1973 | Alpers | 178/DIG. 21 |

OTHER PUBLICATIONS

"Automatic TV Tracker Keeps Eye on Missiles", Electronics, Apr. 6, 1964, by J. R. Kruse, pp. 82–87.

Primary Examiner—John C. Martin
Attorney, Agent, or Firm—Flehr, Hohbach, Test, Albritton & Herbert

[57] ABSTRACT

An image enhancement method and apparatus are provided for use with television equipment whereby a uniquely treated object within the field of a television camera is enhanced electronically for presentation on a television receiver to make it more readily observable to the viewer. A particular application involves treating, as by coating, a hockey puck, football or other target such as used in a sporting event that is being televised, with a material which radiates a spectral code or reflects light of a particular frequency not normally present to the same degree in ambient lighting conditions. The technique may be achieved with a single camera and a filter matched to the unique radiation from the target, or, a pair of ganged cameras where, one is of conventional design adapted to televise the entire scene and the other is particularly sensitive to the unique radiation of the target. Two images are formed in each case where the treated object is enhanced, either naturally or with a symbol, with respect to the overall scene making it easily observable to the viewer. A tracking system may be employed that is responsive to the position of the enhanced image whereby the cameras will automatically follow the puck, ball or the like.

14 Claims, 5 Drawing Figures

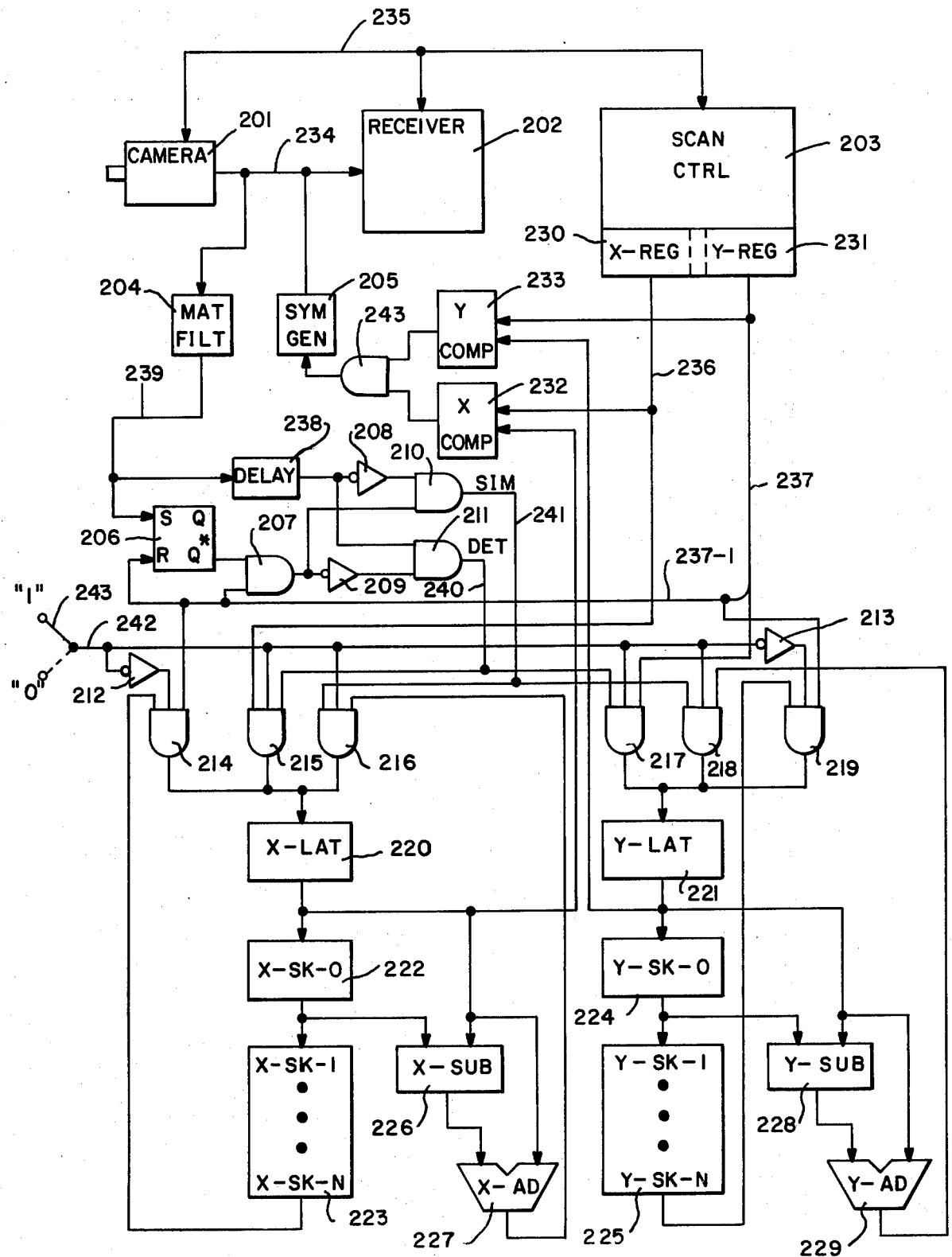
FIG.—3

METHOD AND APPARATUS FOR ENHANCING A TELEVISED OBJECT

CROSS-REFERENCE TO RELATED APPLICATION

This is a continuation-in-part of my U.S. application Ser. No. 256,876 filed May 25, 1972 now U.S. Pat. 3,840,699.

BACKGROUND OF THE INVENTION

1. Field of the Invention

This invention relates to television and other displays and more particularly to a novel method and apparatus for enhancing a displayed object and to a tracking system for enhancing one or more selected objects within a field of view to make the objects more readily observable to the viewer.

2. Description of the Prior Art

Conventional television equipment electro-optically converts a scene to electric signals according to light values of various parts of the scene. While equipment currently in use is satisfactory for most television needs, it tends to be somewhat deficient particularly for sporting events, in which a relatively small ball or puck is used. When a game is being televised, normally the camera must be kept at a long range focus in order that the overall play may be observed. However, when viewed in long range, the ball or puck becomes extremely difficult to follow because of its size as well as of the crowding and action of the players. Oftentimes, even the camerman finds difficulty in following the course of the ball and, from time to time, may direct the camera elsewhere than where the ball is actually located. Viewers, of course, find this frustrating and it detracts from their enjoyment of the game.

It is an object of the present invention to provide a method and apparatus adapted to enhance one or more objects in a scene whereby those objects will be made more visible to the viewer. Another object of this invention is to provide a tracking system for television equipment whereby the television camera automatically will follow a particular object within the televised scene.

SUMMARY OF THE INVENTION

This invention features a method for enhancing an object where the object has a spectrally unique characteristic in a natural environment, scanning both the object and the environment to generate electrical signals corresponding thereto, electronically processing said signals to enhance the unique signals from said object and displaying both the environment and the object on an output screen.

This invention also features a television system for implementing the foregoing method including television camera means sensitive to the natural environment and to unique radiation from an object, circuit means for separately processing the electrical signals corresponding to the image of the object for enhancement thereof and means for combining the images of the object and the environment for display on a screen. In one particular embodiment, a symbol generator is employed for electronically generating a symbol and for superimposing the symbol over the object in the display of the overall scene. The camera and receiver scan the scene by X-axis and Y-axis scan controls. Means are provided for storing an address, defined by the X and Y coordinates, which determines the location at which the object appears in the overall scene. A matched filter detects a unique signal which corresponds to the object and responsively causes a symbol generator to introduce a symbol into the receiver display signal to cause the symbol to be displayed at the location defined by the address.

In a further embodiment of the invention, means are provided for storing the address at which an object is detected within the overall scene. If an object is not detected after one or more scan cycles, means are provided for storing and generating the symbol at a simulated address approximating the expected position of the object within the overall scene.

In accordance with another feature of the invention, memory means are provided for storing a sequence of previous object addresses. Switch means are provided for causing the memory to be sequentially read out to display a symbol at the previously stored symbol locations thereby providing a retrace of past symbol locations.

In one embodiment of the invention, at least a pair of cameras are operatively connected to one another, one camera adapted to produce a conventional scanned image of a scene being televised and the other adapted to scan only a particular object in that scene which has been pre-treated to radiate a unique spectral image. The recorded images of both cameras are combined through processing circuitry such that the selected object is electronically enhanced and the combined transmitted scene, when reconstructed on a receiver, will produce a visibly enhanced object against the background of the total scene. Automatic tracking equipment may be provided that is operatively responsive to the position of the selected object whereby both cameras will automatically track the object.

BRIEF DESCRIPTION OF THE DRAWINGS

FIG. 3 depicts a schematic representation of a single camera embodiment of the invention.

DETAILED DESCRIPTION OF THE PREFERRED EMBODIMENTS

Figure 1:
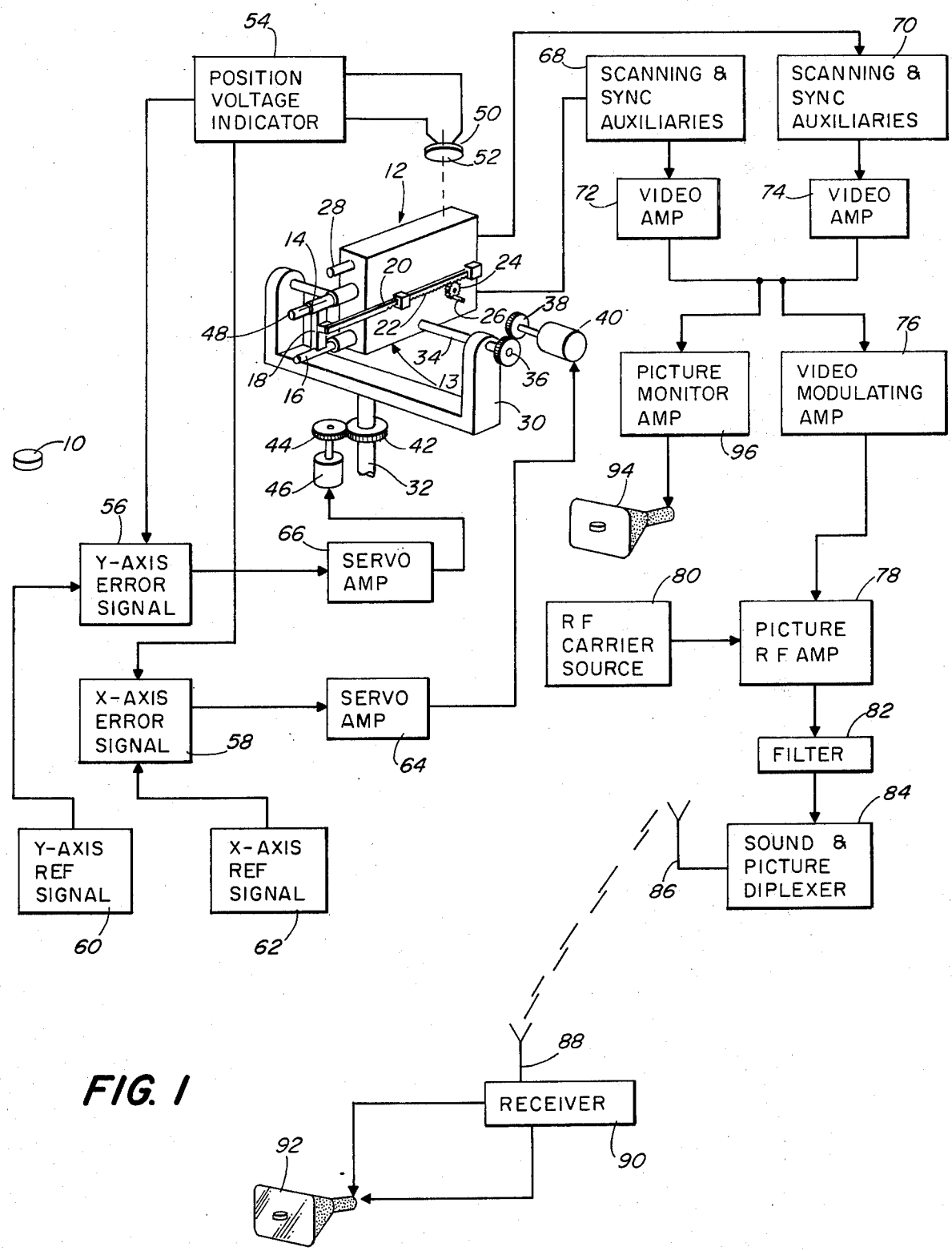
FIG. 1 is a somewhat schematic diagram of a television system made according to the invention.

Referring now to the drawings, there is schematically illustrated a diagram of the invention as embodied in a television tracking system which may, by way of example, be used to televise a sporting event such as a hockey game. When the system is used to televise a hockey game, a puck 10 is treated in such a manner as to make it spectrally unique in a natural or artificial environment. This may be done by coating or impregnating the puck with a material which will reflect or radiate a unique wavelength not normally present to any significant level in normal conditions. For example, a fluorescent coating may be employed to provide the unique reflective characteristics. The reflectivity may be enhanced by incorporating retro-reflective beads in the fluorescent medium. Various coatings for this purpose are available and, where the event is indoors and artificially illuminated, an ultra-violet light may be employed as part of the illumination system whereby the treated puck will give off a unique spectral reflection distinct from the surrounding background.

The television equipment employed to televise the event in the FIG. 1 embodiment, includes a pair of television cameras 12 and 13 mounted on top of one another or side by side with each camera equipped with mechanically coupled lenses 14 and 16 typically of the zoom type. The lenses preferably are mounted for reciprocating movement to change the focus and the magnification of the televised scene and are connected to one another as by a bracket 18. The bracket 18 may be moved in and out by a shipping rod 20 slidably mounted to the side of the camera housing and provided with rack teeth 22 in mesh with a pinion 24 having a crank handle 26 by which the operator may manipulate the lenses. In practice, the camera 12 is equipped with a viewing lens 28 by which the operator may view the scene that is being televised.

Both cameras are gimballed for movement about vertical and horizontal axes by means of a yoke 30 mounted for rotation about a vertical axis by means of a column 32, with a trunnion 34 extending between the arms of the yoke and fixed to the camera to permit camera movement about a horizontal axis. The end of the trunnion 34 is provided with a pinion 36, in mesh with a gear 38 driven by an X-axis servo-motor 40. The column 32 likewise is provided with a pinion 42 in mesh with a gear 44 driven by a Y-axis servo-motor 46. The servo-motors are parts of the tracking system by which the cameras automatically follow the motor of the puck 10 or other object such as a football, golfball, or the like, which has been treated with the unique spectral material.

The tracking system in the illustrated embodiment, functions in response to the upper camera which is equipped with an optical filter 48 on the lens 14, which filter, preferably, is of a narrow pass-band type selected to pass only that wavelength reflected by the treated puck 10 and substantially excluding all other parts of the spectrum. Interference filters or blocking filters may be employed for this purpose. In any event, the upper camera will view through the lens 14 only the image of the puck 10 and this image will be directed against a light position sensing device 50 such as a silicon Schottky barrier duel axis detector sold by United Detector Technology of Santa Monica, California. The light position sensing device 50 is a sensitive silicon photodetector that provides electrical output signals corresponding to the position of a light spot 52 on the surface and also provides an electrical signal corresponding to the intensity of the light spot. The voltage output of the device 50 thus is an analog signal corresponding to the coordinate position of the light spot 52 on the face of the device 50. The light spot 52 is focused by the lens 14 and, typically, when the spot is centered on the face of the device 50 the maximum voltage output is produced. The device 50 thus provides X and Y voltage signals corresponding to the coordinate position of the light spot. The signals corresponding to the coordinate position of the light spot. The signals are passed through a position voltage indicator 54 which, in turn, feeds the X and Y signals separately to a Y-axis error signal circuit 56 and to an X-axis error signal circuit 58. The error signal circuits 56 and 58 each receives separate inputs from a Y-axis reference signal generator 60 and an X-axis reference signal generator 62 whereby a differential signal is produced by each error signal circuit. The differential signals represent the distance that the light spot 52 is displaced from the center of the device 50 along both axes. The differential signals are then fed into servo-amplifiers 64 and 66 which drive, respectively, the servo-motors 40 and 46 whereby the camera automatically tracks the puck 10 and the light spot 52 is maintained on the center of the detector 50.

Various mechanical or electronic means may be incorporated to dampen the motion of the tracking equipment and prevent quick, jerky movements of the televised scene.

The image enhancement portion of the television system is obtained by combining the outputs of the two cameras so that one image is superimposed on the other. Each of the cameras is provided with separate scanning and synchronous auxiliary units 68 and 70, respectively, with each unit providing an output to video amplifiers 72 and 74, respectively. The outputs of the two amplifiers are combined and fed into a video modulating amplifier 76 which is combined with an RF carrier in a picture RF amplifier from an RF carrier source 80. The output of the RF amplifier is passed through a filter 82 into a sound and picture diplexer 84 from which it is transmitted by an antenna 86 to a receiving antenna 88 connected to a receiver 90 provided with a cathode ray tube 92. The transmitting equipment typically is provided with a monitoring tube 94 receiving the combined signals through a picture monitor amplifier 96.

Insofar as two separate images are generated by the two cameras with the lower camera televising the entire scene and the upper camera televising only the coated puck or the like, the image of the puck as viewed up by the upper camera will be superimposed over the total scene scanned by the lower camera so that the puck image will be enhanced with respect to all other background imagery. The enhanced puck image thus is made more easily visible by the viewers. The enhancement may take the form of a bright coloring of the object on the screen or the image of the object may be converted into a small circle, arrow, etc., superimposed on the scene.

The system may be used to advantage to televise a wide variety of sporting events such as football, baseball or golf wherein a ball or other object is employed, or for races to determine the winners in a contest. For example, skiers may have their ski tips coated with a particular fluorescent substance so that it will be enhanced by a television system of the sort disclosed herein. The technique may also be applied to horse and/or dog races to determine the position of the winning animal.

Figure 2:
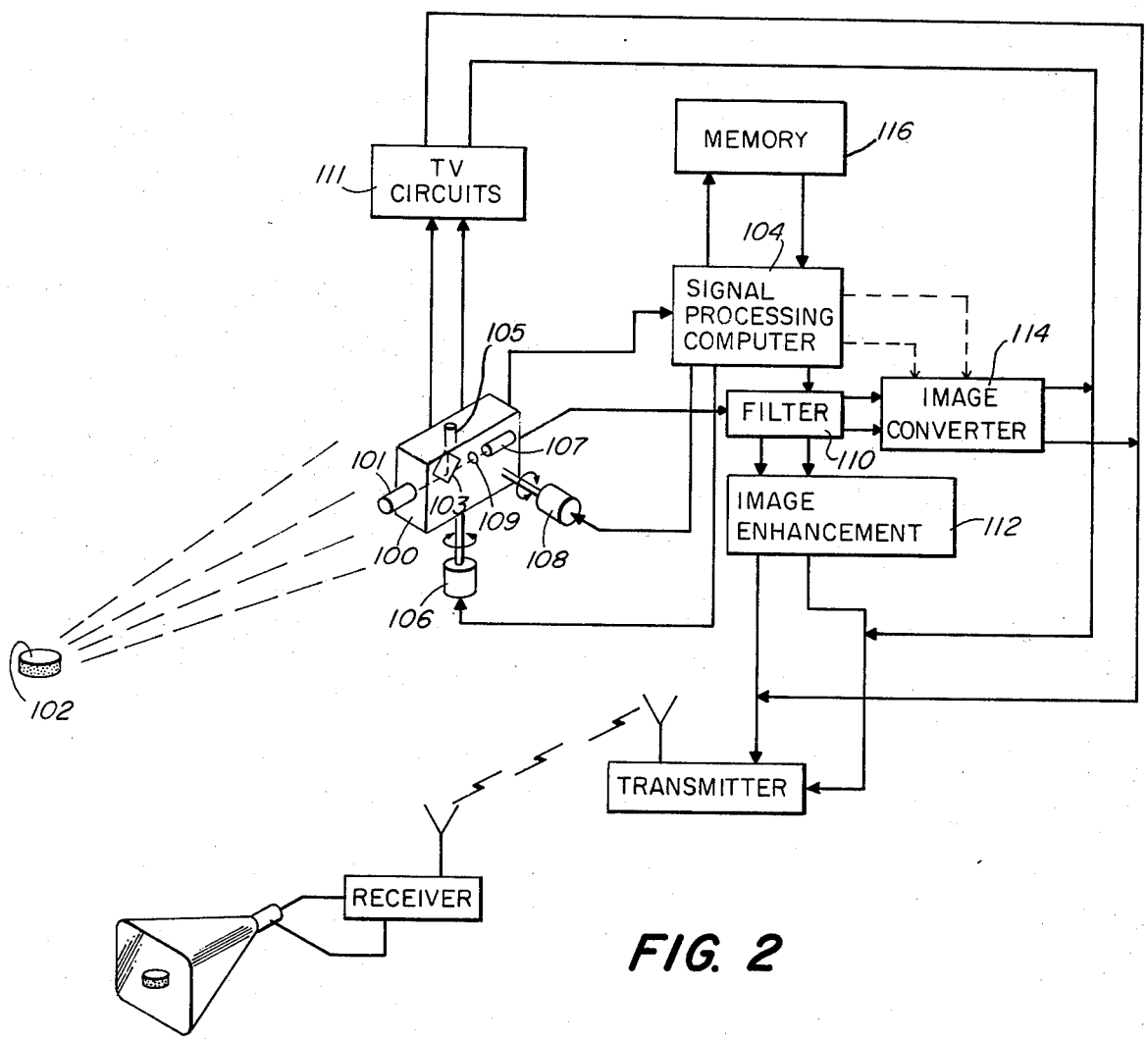
FIG. 2 is a view similar to FIG. 1 showing a modification of the invention, and, FIGS. 2a and 2b are perspective views showing receivers with different possible displays.
Figure 2A:
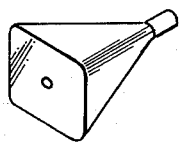

Referring now to FIG. 2 there is illustrated another embodiment of the invention and, in this system, a single camera 100 is used to scan the entire scene including a specially treated object 102 such as a puck. The camera is sensitive to the unique wavelength of the object 102 and will generate unique output signals corresponding to the object's image and its position. In the FIG. 2 system, the camera 100 is equipped with a single lens 101 and an image splitter 103 along the optical path of the lens for directing separate images to a pair of vidicon or like tubes 105 and 107. A filter 109 is positioned in front of the tube 107 and is of a passband characteristic matched to the spectral code of the treated puck so as to pass only the image of the puck 102 while the complete scene is directed to the tube 105. The signals from the tube 107 are fed into a computer 104 for processing. The processed signals are then combined with normal camera output signals from standard television circuits generally indicated by reference character 111 to either enhance the image of the object 102 or to substitute an appropriate symbol such as a dot, arrow or circle where the object should appear so that it may be more readily followed. Optionally, automatic tracking servos 106 and 108 may be employed and operated by the computer 104. The output from the signal processing computer 104. The output from the signal processing computer 104 is through a filter 110 which passes only those signals corresponding to the unique spectral code radiated by the puck 102. The signals are then enhanced by image enhancement circuitry 112 prior to being combined with the standard television signals from the circuit 111. If the image of the puck is converted to a circle, dot or other symbol image converting circuitry 114 is provided for the output of the filter 110 for superposition over the output of the television circuits 109. Such a converted alternative image is displayed on the face of the tube as suggested in FIG. 2A wherein the puck appears as a circle, preferably white for a black and white television, or some bright color for a color television system.

Figure 2B:
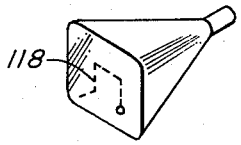

In order for the path of the puck to be presented even more vividly, a memory 116 may be added to the computer so that the path of the puck is stored, at least for a short time, and its track 118 is presented on the screen as suggested in FIG. 2B. The track may be shown by a dotted or broken line or other display as desired.

The computer 104 may be programmed to detect certain wavelength or a particular combination of wavelengths not normally found in a natural environment. If such programming of computer 104 is employed, the need for filter 110 may be elliminated and hence it may be removed. Obviously the camera 100 must be sensitive to the unique spectral signal as well as to the standard environment. To this end, optical filters may be employed and/or electrical detectors (for example, detectors for measuring the relative amplitudes of color component signals) to separate the unique signals from the standard signals. This provides a capability of identifying a variety of objects and makes the system adaptable to a variety of applications in addition to sporting events. For example, railroad cars may be identified as a pattern of uniquely color-coded areas located oppositely a television camera. Colored rectangles in different orientations may be used to generate identifying pulses in a BCD code. Broadly defined, the method and apparatus involves the introduction of an artificial medium into a natural environment and scanning the natural environment with a television camera sensitive to the artificial medium and to the natural environment and adapted to process the resulting image.

The object may be treated in various ways with appropriate changes in the sensitivity of the system. For example, a coating of ultra-violet material may be applied to the object with the object being illuminated by black light and the camera may be made sensitive to the unique wavelength radiated by the puck. Other approaches may include heating the object so that it will emit infrared radiation. Such a system would, of course, require that the television system include an infrared detector sensitive to the radiation from the object. Other similar techniques will appear to those skilled in the art.

The spectral uniqueness characterizing the object to be enhanced, may be a single unique frequency of radiation of or any combination of frequencies of radiation. The system may be adapted to enhance more than one object since two or more objects may be treated with the same or different unique spectral characteristics for separate enhancement. For example, the suggested hockey puck may be treated with one spectral code while the goal may be treated differently.

Where the object is subject to periodic obscurement so that there is not a constant direct line of sight between the object and the camera, as may occur in many sporting events, the future path of the object may be inferred or predicted from its past location and direction or by its position from a different view of the scene. For example, by using two or more television cameras at different angular positions, the positional information of the object by one camera may be furnished to another camera. A further modification or adaptation of the system may be to use a plurality of different spectral codes as a means for identifying a number of different targets. For example, in a football game, each player on a team may have a differently coded helmet and the names of all or selected players whose helmets are visible at a given time may be shown from a memory either to the general viewers or only to the announcer equipped with a monitor as a means for maintaining a continuing identification of the players.

Referring to FIG. 3, another embodiment of the present invention is shown. In FIG. 3, the camera 201 may be the same as either of the cameras 12 in FIG. 1 or 100 in FIG. 2. The camera outputs a video signal on line 234 which has electrical characteristics sufficient to represent the unique spectrum from the target in the scene being televised. The target can, of course, be a treated puck or other object having unique spectral characteristic as previously explained. The video output from camera 201 is input to receiver 202 and forms a display in receiver 202 in a conventional manner. In addition to the video signal on line 234, camera 201 and receiver 202 have conventional scanning circuitry for raster scanning the detected and displayed images. The scan controls (SCAN CTRL) 203 are shown separately from camera 201 and receiver 202 for purposes of clarity. Of course, in a conventional system, both the cameras 201 and a receiver 202 have synchronized scanning circuits where the scan control signals are typically diplexed over the video channel 234 all in a conventional manner.

For purposes of the present ivention, the scan control 203 has a digital X register (X-REG) 230 and a digital Y register (Y-REG) 231 which store x and y coordinates for determining the instantaneous location of the video signal on line 234 within the display of the receiver 202. In a typical operation, the X register 230 is stepped through a complete cycle to provide for the line scan of the raster pattern on receiver 202. Each time register 230 completes a full line scan, register 231 is incremented one count to enable the X register to scan the next line. The digital output on bus 236 from the X register therefore defines the instantaneous X coordinate of the raster pattern in receiver 202. Similarly, the digital output on bus 237 defines the instantaneous Y coordinate of the raster pattern in receiver 202. Y register 231 also provides on bus 237, the high-order line 237-1. The high-order line 237-1 is energized after each scan of the whole raster pattern for receiver 202, that is, at the end of each scan cycle.

In FIG. 3, the matched filter (MAT FILT) 204 is connected to the video line 234. Filter 204 is a conventional device which functions to detect in the video signal on line 234 a unique signal associated with the target being detected by camera 201. For example, when the target is a phosphorized puck, filter 204 has a detection capability which matches the component in the signal on line 234 which results from the spectral band of light radiated from illuminated phosphor. Where the input to camera 201 includes a unique digital code (such as a unique combination of frequencies), filter 204 can be a digital filter for detecting that code.

Whenever filter 204 detects the presence of the unique signal in the signal on line 234, a 1 output is provided on line 239. Line 239 is connected to the set (S) input of set/reset latch 206. Also the output on line 239 is connected through a delay 238 to AND gate 211 and, as inverted in inverter 208, to AND gate 210. Delay 238 can include a counter or other means to allow a fixed number of detections by filter 204 for each scan cycle. If so utilized, the counter can be reset after each scan cycle by the signal on line 237-1. Delay 238 is at least long enough to allow the setting of latch 206 to be propagated through inverter 209. Latch 206 receives its reset (R) input from the high-order line 237-1 from the Y register 231.

The complementary output (Q*) from latch 206 is connected as one input to AND gate 207 which receives its input from the line 237-1. The output from AND gate 207 is input to AND gate 210 and inverted through inverter 209 for input to AND gate 211. The function of latch 206 and the gates 207 through 211 is to provide an enable signal DET output from gate 211 whenever during one scan cycle the matched filter 204 has detected the presence of the target at least once during the scan cycle. If it is desired to insure that only one detection per scan cycle is allowed, an AND gate having as inputs line 239 and Q* from latch 206 can be inserted before delay 238. Whenever filter 204 has detected the target during a raster scan, gate 211 outputs a 1 for enable signal DET. Gate 211 outputs a 1 since its input from delay 238 is a 1 and its input from inverter 209 is a 1. Inverter 209 has a 1 output since the output from AND gate 207 is a 0 since the input from the Q* output of latch 206 is a 0. The Q* output on latch 206 is 0 since the detected pulse on line 239 sets latch 209.

Whenever during a scan cycle no pulse has appeared on line 239, indicating that the target was not detected by camera 201 and filter 204, a SIM enable signal is generated from gate 210. Gate 210 produces a 1 output since its input from gate 207 is a 1. Gate 207 has a 1 on its output since after an entire scan, the high-order bit line 237-1 produces a 1 which is input to gate 207. Since flip-flop 206 has not been set, its Q* output remains 1 so that gate 207 is satisfied by the line 237-1 input. In the case where latch 206 has been set, it is assumed that the signal on line 237-1 is removed prior to the time that the latch 206 is reset and hence gate 207 does not become actuated. Of course, in order to avoid race conditions, a flip-flop firing on the trailing edge of the line 237-1 pulse can be employed on the R input to latch 206.

The DET enable line 240 is input to AND gates 215 and 217. Gates 215 and 217 include an input for each of the lines in buses 236 and 237. Gate 215 connects, via the bus 236, the X register 230 as an input to the X latch 220 under control of the DET signal.

In a similar manner, the gate 217 connects, via bus 237, the contents of the Y register 231 as an input to the Y latch 221 under control the DET enable signal on line 240.

The apparatus in FIG. 3 thus far described causes the address of a detected target, as stored in the registers 230 and 231, to be stored in the latches 220 and 221. In the absence of a detected target, the DET enable signal on line 240 is not generated and hence the contents of registers 230 and 231 are not transferred to latches 220 and 221.

In the absence of an DET signal during a scan cycle, a SIM enable signal is generated on line 241. The signal on line 241 is input to AND gates 216 and 218. When enabled, gate 216 functions to load the output from adder 227 into the X latch 220. When enabled, the function of latch 218 is to load the output from adder 229 into the Y latch 221. The outputs from adders 227 and 229 are simulated X and Y coordinates of a target location within the scene displayed on receiver 202. The generation of the simulated coordinates will be hereinafter described.

The gates 215, 216, 217 and 218 have a further control input from line 242. line 242 connects a logical 1 from switch 243 to those gates when switch 243 is in the shown position. When switch 243 is switched to the phantom position, a 0 is connected to gates 215 through 218 hence disabling them indicating that neither a detected address nor a simulated address is input to the latches 220. Under the condition where switch 243 is a 0, line 242 through inverters 212 and 213 and enables gates 214 and 219 whereby addresses from stack memories 223 and 225 are loaded into latches 220 and 221, respectively, in a manner hereinafter described.

Independent of which of the gates 214 through 219 loads the latches 220 and 221, the outputs from the latches 220 and 221 are input to the X and Y comparators 232 and 233, respectively. The X comparator (X COMP) 232 functions to compare the contents of latch 220 with the contents of registers 230. When they compare, an output 1 is produced to AND gate 243. Similarly, the functions of the Y comparator (Y COMP) 233 is to compare the contents of the Y latch 221 with the contents of Y register 231 and when they compare to provide an output 1 to gate 243. When both X and Y addresses compare, gate 243 provides an output to symbol generator (SYM GEN) 205. Symbol generator 205 responsively generates a symbol representing the target being detected and connects a video signal to line 234 for input to receiver 202 in combination with the video signal from camera 201. Accordingly, the symbol from generator 205 is superimposed over the detected target if any, on line 234 from camera 201. if no unique signal is detected by filter 203, a symbol will still be inserted by generator 205 with a simulated address provided in the manner now described.

In FIG. 3, the X latch 220 connects to a second latch 222 which in turn connects to a push-down stack 223 of N stages. Together, latches 220, 222 and 223 comprise a self-clocking push-down stage of N+2 stages. Each time an input is stored in latch 220, via one of the gates 214 through 216, the contents of latch 220 are transferred to latch 222. Similarly, each time the contents of latch 220 are input to latch 222, the contents of latch 222 are shifted to the first of the N stages in stack 223. In a similar manner the contents of each stage in stack 223 is pushed down to the next higher-numbered stage for each energy into latch 220.

In a manner similar to the X latches, the Y latches 221, 224 and 225 also form a self-clocking push-down stack of N+2 stages. Latches 221 and 224 comprise the first two stages of the stack and latches 225 comprise the last N stages of the stack.

In FIG. 3, a simulated X address is formed by subtracting the difference between the contents of latch 220 and the contents of latch 222 in the X subtractor (X-SUB) 226. The difference quantity output from subtractor 226 is input to the X adder (X-AD) 227 which adds the difference quantity to the contents of latch 220. When a SIM enable signal appears on line 241, the output from adder 227 is gated through AND gate 216 and stored in the latch 220. At the same time that the new value is loaded into latch 220 from adder 227, the previous contents of latch 220 are input to latch 222. In this manner at least once each scan cycle the contents of the X latch 220 are updated with either a detected X address derived from the X register 230 or with a simulated X address formed from the adder 227. The simulated address from adder 227 is one projected to be at a point continuing on the previous trajectory of the target, that is, the spectrally unique object. If the target was previously standing still as indicated by the equality of the contents of the latches 220 and 222, the difference from subtractor 226 will be zero and hence the contents and latch 220 when updated by gate 216 will be unchanged. If the difference between the contents of latches 220 and 222 is a finite number such as 4, then the rate of change of the X addresses continues to be 4 until a new detected address is inserted in latch 220.

While the description of the simulated X address has been described, the Y subtractor (Y-SUB) 228 and the Y adder (Y-AD) 229 function in the same manner with respect to Y addresses. The rate of change of the simulated Y addresses is the same as the rate of change of the detected addresses prior to insertion of the simulated addresses.

The simulated or detected address insertion into latches 220 and 221 and the push-down stacks occurs automatically when switch 243 is connected to a logical 1 as shown. The contents of the push-down stack can be utilized to cause the symbol from generator 205 to retrace its last N+2 locations by throwing swith 243 to the phantom position. When thrown, a retrace of the last N locations of the target occurs including both the detected and simulated addresses stored in the push-down stacks. The retrace occurs automatically when switch 243 is in the phantom position since a logical 0 enables gates 214 and 219. Each time a pulse occurs on line 237-1 after each scan, the last entry in the stacks 223 and 225 is reinserted into the latches 220 and 221, respectively, via gates 214 and 219, respectively. While the retrace is occurring, the video signal is typical held frozen on a given scene. Of course, the video signal can also be replayed with the symbol retrace or the symbol can be recorded in the video signal and replayed.

While the symbol generator 205 in FIG. 3 is connected to the video line 234 for generating a video signal in a conventional manner, generator 205 may take various other forms. In the embodiment shown, generator 205 is a conventional device for generating a circle, arrow or other symbols. In the case of a television system, the symbol generator 205 is preferably connected in the video line from the camera prior to the point where transmission to many remote receivers occurs. The symbol generator 205 may, however, be associated with the receiver and may encompass an input other than through a video signal.

While the invention has been described in connection with a television system, the invention of course supplies to optical and other scanning systems for displaying detected objects.

While the embodiment of FIG. 3 has been described in connection with a single camera system, the two camera systems of FIG. 1 may be employed by replacing the matched filter 204 with the second camera system.

While the embodiment of FIG. 3 has not specifically shown the servo system for positioning camera 201, the servo system of FIG. 1 can, of course, be employed in connection with FIG. 3. In that implementation, the input to the Y-axis error signal of unit 56 and the input to the X-axis error signal of unit 58 in FIG. 1 are derived from the Y-latch 221 and the X-latch 220 of FIG. 3, respectively.

While the means for generating the simulated addresses of the symbol in the embodiment of FIG. 3 has been predicated upon the prior trajectory of the symbol, the simulated address generation can be predicated upon any algorithm. The algorithm can be implemented by a general purpose computer or by other apparatus.

While this invention has been particularly shown and described with reference to preferred embodiments thereof it will be understood by those skilled in the art that various changes in form and details may be made therein without departing from the spirit and the scope of the invention.

What is claimed is:

1. A method of enhancing a televised object comprising the steps of:
   a. treating the object to make the same spectrally unique in a natural environment in order to provide a radiating spectral code;
   b. scanning said natural environment including said object with television camera means sensitive to both said environment and said spectral code to form an electrical image of the environment and of the shape and position of the spectral code in the environment;
   c. signal processing said image to detect the position of the spectral code;
   d. electronically generating a representation of the object independent of the shape of the object detected by said scanning,
   e. substituting said representation in the position where the spectral code has been detected; and
   f. displaying concurrently said image of the environment and said representation of the object on an output screen.

2. A method of enhancing the display of a scene where the scene includes a spectrally unique object having a shape and location within the scene comprising the steps of:
   scanning said scene to generate image signals representing said scene,
   sensing said image signals to detect the location of said spectrally unique object in said scene,
   generating a representation of said spectrally unique object independently of the shape of said object represented by said image signals,
   displaying said image signals to form a display of said scene, and
   concurrently displaying said representation superimposed on said display of said scene at said location.

3. The method of claim 2 wherein said scanning step includes scanning said scene with a first camera to generate first image signals representing said scene and scanning said scene with a second camera to generate second image signals representing said spectrally unique object, and wherein said sensing step is responsive to said second image signals.

4. A method of enhancing the display of a scene where the scene includes a spectrally unique object comprising the steps of:
scanning said scene with camera means to generate image signals representing said scene,
generating a representation of said spectrally unique object independent of the shape of said object represented by said image signals,
storing a position address to form a stored address for defining the location of said spectrally unique object in said scene,
sensing said image signals to form a detected address defining the location of said spectrally unique object in said scene, and
updating said stored address with said detected address,
displaying said image signals to form a display of said scene,
concurrently displaying said representation superimposed on said display of said scene at said stored address.

5. The method of claim 4 including the step of updating said stored address with a simulated address when said spectrally unique object is not sensed in said image signals.

6. The method of claim 4 including the steps of storing a plurality of stored addresses and sequentially displaying said representation at locations defined by each of said stored addresses.

7. An apparatus for enhancing the display of a scene where the scene includes a spectrally unique object comprising,
means for scanning said scene to generate image signals representing said scene,
means for sensing said image signals to detect the location of said spectrally unique object in said scene,
means for generating a representation, when enabled, of said spectrally unique object, said means for generating operable independently of the shape of said object represented by said image signals,
means for displaying said image signals to form a display of said scene, and
means for concurrently enabling said means for generating to superimpose said representation on sid display of said scene at said location.

8. An apparatus for enhancing the display of a scene where the scene includes a spectrally unique object comprising,
scanning means for scanning said scene to generate image signals representing said scene,
address means for defining the scan address of said scanning means,
sensing means for sensing said image signals to provide a detected signal when said spectrally unique object is detected,
memory means for storing the scan address from said address means to form a stored address in response to said detected signal,
a symbol generator for generating a symbol representing said spectrally unique object,
display means for displaying said image signals to form a display of said scene, and
control means for concurrently enabling said symbol generator to superimpose said symbol on said display of said scene at said stored address.

9. The apparatus of claim 8 wherein said address means includes X and Y registers for storing said stored address as the instantaneous X and Y coordinates of a raster scan pattern and wherein said memory means includes X and Y latches for storing the contents of said X and Y registers.

10. The apparatus of claim 8 wherein said control means includes means for generating a simulated address and means for storing said simulated address in said memory means.

11. The apparatus of claim 8 wherein said control means includes a comparator for comparing the scan address from said address means with the stored address from said memory means to provide said detected signal when said scan and stored addresses are equal.

12. The apparatus of claim 11 wherein said memory means includes push-down stack means having a first stage for storing said stored address and at least a second stage for receiving the contents of said first stage as a second stage address, wherein said control means includes means for forming a simulated address equal to said stored address added to the difference between said stored address and said second stage address, and wherein said control means includes means for storing said simulated address in said first stage in response to the absence of said detected signal.

13. The apparatus of claim 12 wherein said memory means includes a push-down stack of N+2 stages for storing the last N+2 addresses of said symbol and wherein said control means includes means for cycling the addresses from said push-down stack into said first stage whereby said symbol generator is caused to retrace its position on said display of said scene.

14. The apparatus of claim 8 wherein memory means inclues means for storing N+2 addresses of said symbol and means to display said N+2 addresses.

* * * * *